United States Patent [19]

Inoue et al.

[11] Patent Number: 5,734,931
[45] Date of Patent: Mar. 31, 1998

[54] PHOTOGRAPHING APPARATUS

[75] Inventors: Takashi Inoue; Hideto Kitazawa, both of Hachioji; Koji Kato, Tama; Tatsuya Suzuki, Tokyo, all of Japan

[73] Assignee: Olympus Optical Co., Ltd., Tokyo, Japan

[21] Appl. No.: 452,575

[22] Filed: May 25, 1995

[30] Foreign Application Priority Data

May 27, 1994 [JP] Japan ................................. 6-115508

[51] Int. Cl.⁶ .............................. G03B 17/10; G03B 5/00
[52] U.S. Cl. ............................................................ 396/52
[58] Field of Search .......................... 354/400, 402–409, 354/219, 221; 396/52, 53, 54, 55

[56] References Cited

U.S. PATENT DOCUMENTS

| | | | |
|---|---|---|---|
| 5,117,247 | 5/1992 | Nakai et al. | 354/222 |
| 5,148,202 | 9/1992 | Yoshida | 354/222 |
| 5,335,035 | 8/1994 | Maeda | 354/219 |
| 5,345,287 | 9/1994 | Taguchi | 354/221 |
| 5,416,558 | 5/1995 | Katayama et al. | 354/446 |
| 5,424,796 | 6/1995 | Kondoh | 354/403 |
| 5,498,944 | 3/1996 | Nakata | 354/400 |

FOREIGN PATENT DOCUMENTS

| | | |
|---|---|---|
| 59-48743 | 3/1984 | Japan . |
| 60-143330 | 7/1985 | Japan . |

*Primary Examiner*—Daniel P. Malley
*Attorney, Agent, or Firm*—Louis Weinstein

[57] ABSTRACT

A photographing apparatus is equipped with a photographing optical system, a film holding member on which the photographing optical system is fixed, a supporting frame which rotatably supports the film holding member around a shaft, an outer supporting frame which rotatably supports the supporting frame around the shaft, a finder optical system which has an optical axis different from that of the photographing optical system and which is mounted on the top surface of the outer supporting frame, an AF distance measuring section for measuring the distance to an object, and a captive cam for driving the film holding member and a captive cam for driving the supporting frames for correcting parallax in accordance with the output of the AF distance measuring section. The captive cams are driven also for correcting the blur of an exposure image.

66 Claims, 10 Drawing Sheets

PHOTOGRAPHING APPARATUS

BACKGROUND OF THE INVENTION

1. Field of the Invention

The present invention relates to a photographing apparatus and, more particularly, to a photographing apparatus which corrects or suppresses image blur occurring at the time of exposure on a film.

2. Description of the Related Art

It is widely known that so-called parallax, in which the image of a subject observed through a finder optical system is different from an exposed image actually photographed in a camera constructed as an optical system wherein the optical axis of a photographing optical system is different from that of a finder optical system. Such parallax is especially marked in close-up photography or the like.

There have been proposed various types of cameras designed to correct for parallax which takes place between the photographing optical system and the finder optical system.

As an example of such cameras, the one disclosed under Japanese Patent Laid-Open No. 59-48743 corrects the parallax produced between a photographing lens and a finder by tilting the photographing lens.

The camera disclosed under Japanese Patent Laid-Open No. 59-48743, however, requires a space for providing a driving device in the vicinity of the photographing lens, resulting in an increased camera size.

Further, the shutter speed unavoidably decreases when the brightness of a subject is low and if the camera is hand held to take a picture, the camera tends to shake with a consequent shaky image while the shutter is released for exposure. This results in a "camera-shake" picture from time to time.

As a photographing apparatus which suppresses such image shaking, a photographing apparatus disclosed, for example, under Japanese Patent Laid-Open No. 60-143330, has photographing means which is rotatably supported in two axial directions and which is equipped with image shaking suppressing means designed to suppress the shaking of a photographing image in response to a shake signal of the photographing apparatus.

The photographing apparatus described under Japanese Patent Laid-Open No. 60-143330 also requires the space for providing the driving device in the vicinity of the photographing lens, presenting a disadvantage of an increased size of the completed camera.

SUMMARY OF THE INVENTION

Accordingly, a first object of the present invention is to provide a photographing apparatus which is capable of correcting parallax and image blur.

A second object of the present invention is to provide a small photographing apparatus which is capable of correcting parallax and image blur.

A third object of the present invention is to provide a photographing apparatus which is capable of performing exposure even if parallax correcting means is inoperative.

A fourth object of the present invention is to provide a photographing apparatus which is capable of correcting or reducing focal error produced by shifting the position of a photographing optical system.

A fifth object of the present invention is to provide a photographing apparatus characterized by a simple structure achieved by employing multifunctional driving means.

A sixth object of the present invention is to provide a photographing apparatus characterized by a simple structure achieved by employing multifunctional control means.

The seventh object of the present invention is to provide a photographing apparatus characterized by minimized load on the driving means.

An eighth object of the present invention is to provide a photographing apparatus characterized by minimized load on the driving means even when the position of an optical device of the photographing optical system is shifted.

A ninth object of the present invention is to provide a photographing apparatus which is capable of retaining a good positional relationship between the entire photographing optical system and a film or an image sensing device.

A tenth object of the present invention is to provide a photographing apparatus which is capable of retaining a good position of the film or the image sensing device in relation to the entire photographing optical system.

An eleventh object of the present invention is to provide a photographing apparatus which is capable of correcting parallax in accordance with the distance to an object or focal length.

A twelfth object of the present invention is to provide a photographing apparatus wherein the vibration occurring in the photographing apparatus does not affect the photographing optical system.

In brief, the photographing apparatus in accordance with the present invention comprises a photographing optical system, a finder optical system having an optical axis which is different from that of the photographing optical system, distance measuring means for measuring the distance to a subject to be photographed, and parallax correcting means for changing the optical relative position of the photographing optical system with respect to a film or image sensing device in accordance with the output of the distance measuring means, wherein the parallax correcting means serves as image blur correcting means at the time of exposure on the film or image sensing device.

These as well as other objects and advantages of the present invention will become further apparent from the following detailed explanation.

BRIEF DESCRIPTION OF THE DRAWINGS

FIG. 10A is a top plan view of an essential section, and FIG. 10B is a right side view of the essential section;

DESCRIPTION OF THE PREFERRED EMBODIMENTS

The embodiments of the present invention will be described with reference to the accompanying drawings.

FIG. 1 to FIG. 7 illustrate the first embodiment of the present invention.

Figure 5:
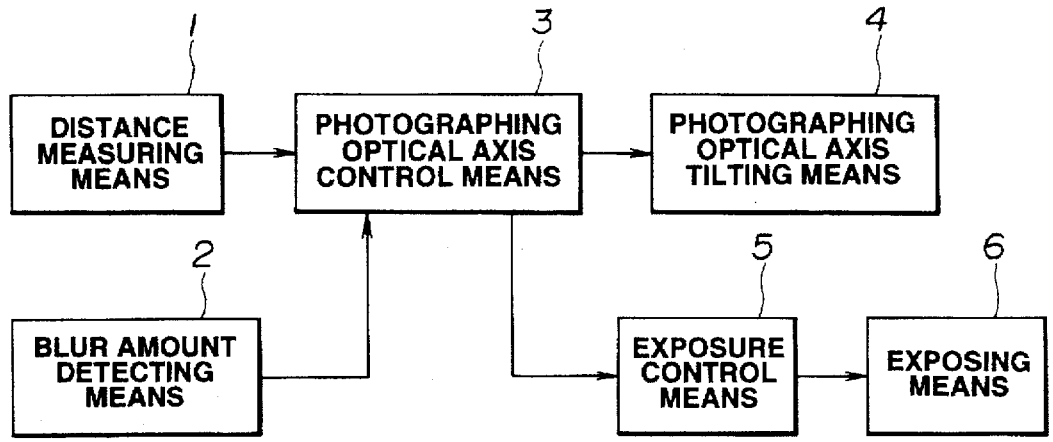
FIG. 5 is a block diagram showing the basic concept of the camera related to the first embodiment.

The basic concept of the camera related to the first embodiment will first be described in conjunction with FIG. 5.

The camera, i.e. photographing apparatus, is constructed by distance measuring means 1 for detecting the photographing distance to a subject, blur amount detecting means 2 for detecting the blur amount of the camera, photographing optical axis control means 3 for controlling the angle of tilt ("tilt" includes vertical and horizontal shifts from home position) of the photographing optical axis with respect to the finder optical axis in accordance with the outputs of the distance measuring means 1 and the blur amount detecting means 2, photographing optical axis tilting means 4 for actually tilting the optical axis of the photographing optical system, exposure control means 5 for controlling exposure by referring to the output of the photographing optical axis control means 3, and exposing means 6 for performing actual exposure under the control by the exposure control means 5.

Thus, the camera is designed to tilt the photographing optical system by the photographing optical axis tilting means 4 to eliminate the difference between the field of view of the finder and the exposure range in accordance with the measurement data obtained from the distance measuring means 1, and it is also designed to tilt the photographing optical system in a direction for controlling the blur by the photographing optical axis tilting means 4 in response to the blur signal issued by the blur amount detecting means 2. In other words, the exposure is carried out by the exposure means 6 while correcting both the parallax and the blur by the same optical axis tilting means 4.

Based on the concept stated above, the embodiment will be described in further detail.

Figure 1:
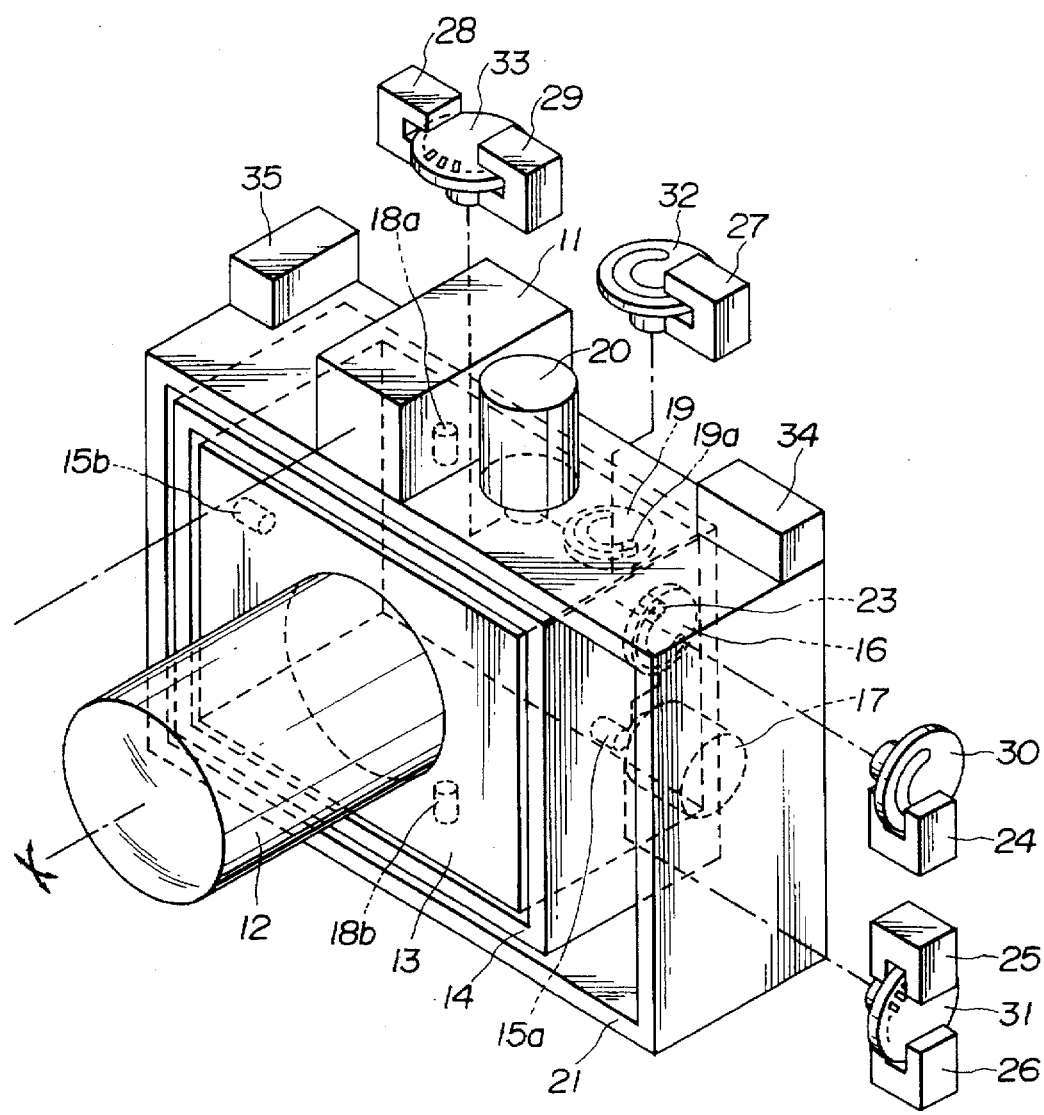
FIG. 1 is an exploded perspective view of the structure of a camera of a first embodiment of the present invention.

FIG. 1 is an exploded perspective view showing the structure of the camera of the first embodiment.

A photographing optical system 12 is provided approximately at the center of the front of the camera; the photographing optical system 12 is fixed onto a film holding member 13 as an integral piece thereof.

The film holding member 13 is a box-shaped member which holds the film, not shown, in a predetermined position at the rear of the photographing optical system 12; it has shafts 15a, 15b jutting out on both sides. Provided at the rear of the top end of the surface, where the shaft 15a is provided, is a pin 23 which engages with the cam groove of a captive cam 16 to be discussed later.

The film holding member 13 is rotatably supported around the shafts 15a, 15b with respect to a supporting frame 14 which is provided outside the film holding member 13. As shown also in FIG. 3, the film holding member 13 is driven by the captive cam 16 via the driving pin 23 to turn around the shafts 15a, 15b.

The captive cam 16 is composed of a substantially disc-shaped member with a cam groove and it engages with a motor 17, which is provided in a slightly lower position, via a train of gears not shown.

The supporting frame 14 has shafts 18a, 18b jutting from top and bottom surfaces so that they intersect orthogonally with the shafts 15a, 15b and it also has a pin 19a which engages with the cam groove of the captive cam 19 (to be described later) which juts out at the rear right end of the top surface where the shaft 18a is provided.

The supporting frame 14 is rotatably supported around the shafts 18a, 18b with respect to a supporting frame 21 which is provided outside the supporting frame 14; it is driven by the captive cam 19 via the driving pin 19a to turn around the shafts 18a, 18b.

The captive cam 19 is composed of a substantially disc-shaped member with a cam groove and it engages with a motor 20, which will be described later, via a train of gears not shown.

The supporting frame 21 is constructed integrally with a camera outer jacket not shown; it has a finder optical system 11 which is disposed approximately at the center on the top surface and which is displaced from the photographing optical system 12. Angular velocity sensors 34, 35 for detecting the blur angular velocity of the camera with respect to the earth are installed on opposite ends of frame 21 with the finder optical system 11 arranged between them. The motor 20 is installed near the right side of the finder optical system 11. Also provided is an AF distance measuring section 40, not shown in FIG. 1, (see FIG. 2) for detecting the photographing distance to a subject.

With the arrangement stated above, the photographing optical system 12, the film which is not shown, and the film holding member 13 are rotatably supported around the two pairs of shafts, namely, the shaft 15a, 15b and the shafts 18a, 18b which orthogonally intersect with each other with respect to the camera outer jacket not shown.

Such rotation axes should be provided in a position which nearly corresponds to the center of gravity of the unit to be rotated or in a position where the moment of inertia around the rotation axes is nearly minimized so as to reduce the reaction force produced by driving the unit and to reduce motor load. A mobile balancer (not shown) may be provided to cope with the shifts in the center of gravity position and the position in which the moment of inertia is minimized, the shifts being caused by the movement of the lens of the photographing optical system at the time of zooming or the like.

The rotational state of the motor 17 is detected by sensing a detection slit 31, which rotates as the motor rotates, by means of photo interrupters 25, 26 for detecting motor revolution.

The photo interrupters 25, 26 are provided in circumferential positions so that they face against each other with the detection slit 31 there-between. The output pulse of the photo interrupter 26 delays by half a phase with respect to the output pulse of the photo interrupter 25 when the motor 17 runs in the forward direction; it advances half a phase when the motor 17 runs in the reverse direction. This arrangement permits the detection of the rotational state including the rotational direction of the motor 17 by a conventional publicly known art.

The captive cam 16 is provided with a detection slit 30 which rotates as the captive cam 16 rotates, the rotational state of the detection slit 30 being sensed through a photo interrupter 24 for positional detection.

Thus, the output of the photo interrupter 24, which monitors the state of the detection slit 30, changes when the captive cam 16 for driving the photographing optical system 12 reaches a predetermined position.

The moment the output of the photo interrupter 24 changes, the pulses of the photo interrupter 25 or the photo interrupter 26 are begun to be added or subtracted, thereby making it possible to relatively recognize the rotational angle of the captive cam 16 and the tilt angle of the photographing optical system 12 about the shafts 15a, 15b.

The drive of the motor 17 can be controlled in accordance with the rotational angle of the captive cam 16 and the tilt angle of the photographing optical system 12 thus obtained, thereby enabling the photographing optical system 12 to be driven to an arbitrary tilt angle around the shafts 15a, 15b.

Likewise, the tilt angle of the photographing optical system 12 about the shafts 18a, 18b can be recognized by sensing the detection slit 33, which rotates as the motor 20 runs, through the photo interrupters 28, 29 constituted just like the photo interrupters 25, 26 and by sensing the detection slit 33, which rotates as the motor 20 runs, through the photo interrupters 28, 29 constituted just like the photo interrupters 25, 26 and by sensing the detection slit 32, which rotates as the captive cam 19 rotates, through the photo interrupter 27 which is constructed just like the photo interrupter 24.

The drive of the motor 20 can be controlled in accordance with the rotational angle of the captive cam 19 and the tilt angle of the photographing optical system 12 thus obtained, thereby enabling the photographing optical system 12 to be driven to an arbitrary tilt angle around the shafts 18a, 18b.

It is apparent that the aforesaid rotation axes can be supported, for example, in a structure to be described later in the second embodiment or various other structures.

Likewise, although the embodiment described above employs two motors 17 and 20, it is apparent that these motors can be used also as a zooming motor or film winding motor, or a mechanism such as a clutch may be used so as to replace the motors 17 and 20 by a single motor.

Figure 2:
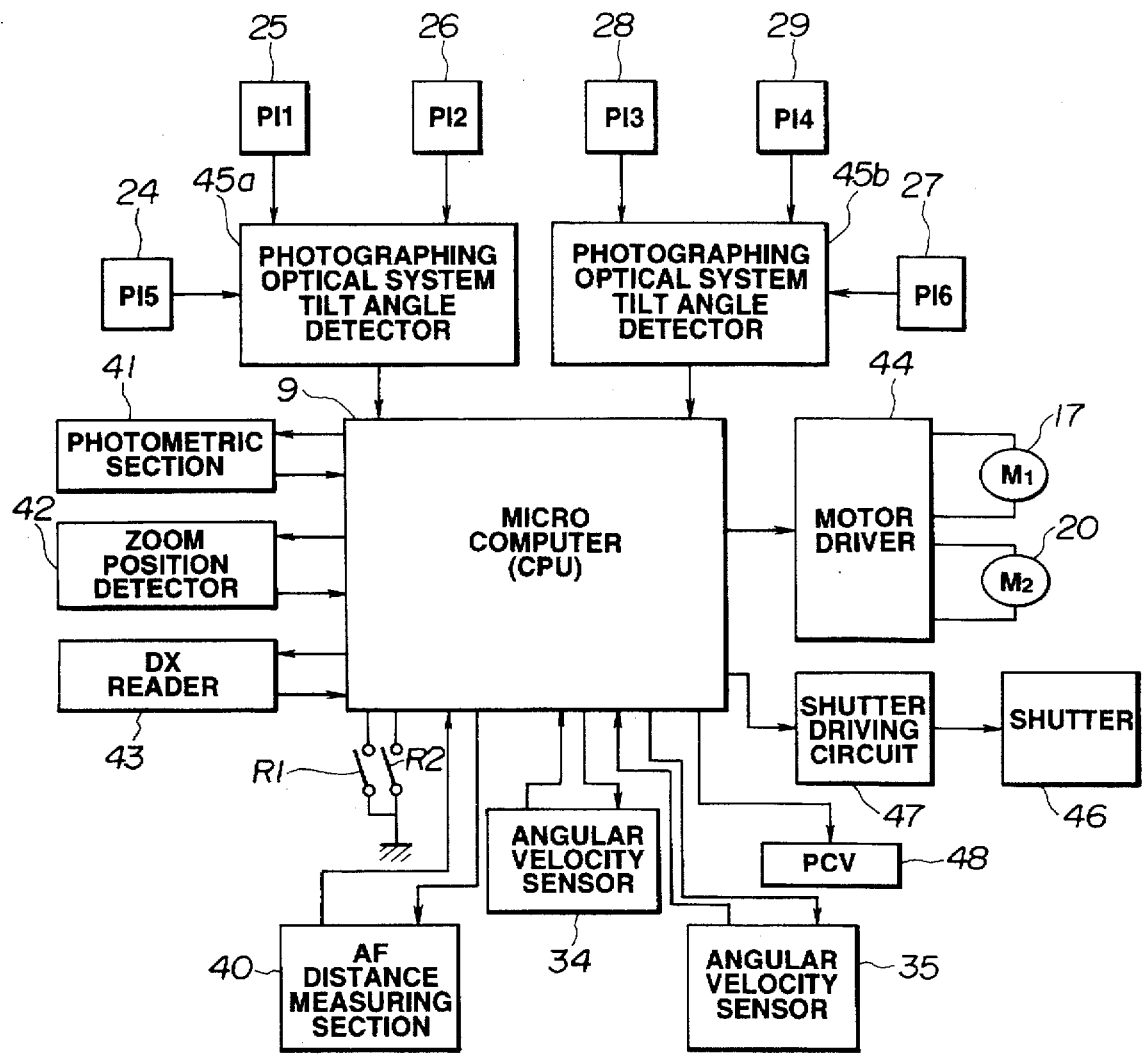
FIG. 2 is a block diagram showing the section related mainly to the electrical construction of the camera of the first embodiment.
Figure 3:
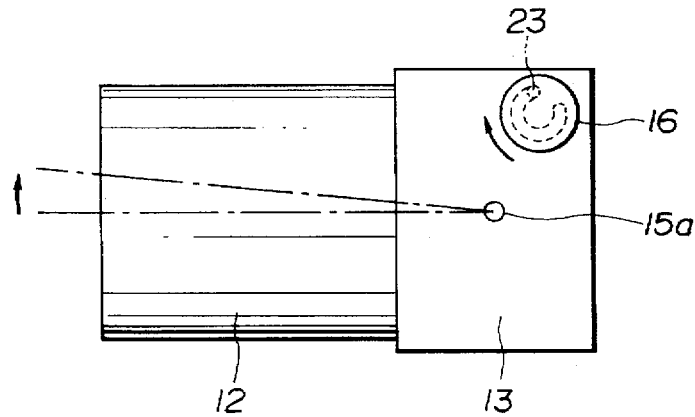
FIG. 3 is a side view showing a photographing optical system and a film holding member of the first embodiment which are rotated by a captive cam.

FIG. 2 is a block diagram showing the section mainly related to the electrical structure of the camera.

The camera is provided with a microprocessor 9 (referred to as "MICRO COMPUTER (CPU)" in the drawing) constructed primarily by a CPU to implement the sequential control of the entire camera.

Electrically connected to the microprocessor 9 are a first release switch R1 and a second release switch R2 composed of two-stage switches, the AF distance measuring section 40 composed of a sensor for measuring the distance to a subject, a photometric section 41 composed of a sensor for measuring the brightness of a subject, a zoom position detector 42 for detecting focal length f of the zoom lens, a DX reader 43 composed of a contactor for detecting a DX code provided in a magazine chamber (not shown) of the camera main body, a PCV 48 composed of a ceramic oscillator which issues an audible warning, a motor driver 44 for driving the motors 17, 20, photographing optical system tilt angle detectors 45a, 45b, a shutter driving circuit 47 for controlling a shutter 46, and the angular velocity sensors 34, 35.

For the zoom position detector 42, detecting means based on an absolute position encoder or detecting means for computing a position relatively by counting the pulses of a photo interrupter or the like may be used.

In addition to the components stated above, a parallax correction ON/OFF switch, a blur prevention ON/OFF switch, and the like are electrically connected to the microprocessor 9 as necessary.

Figure 4:
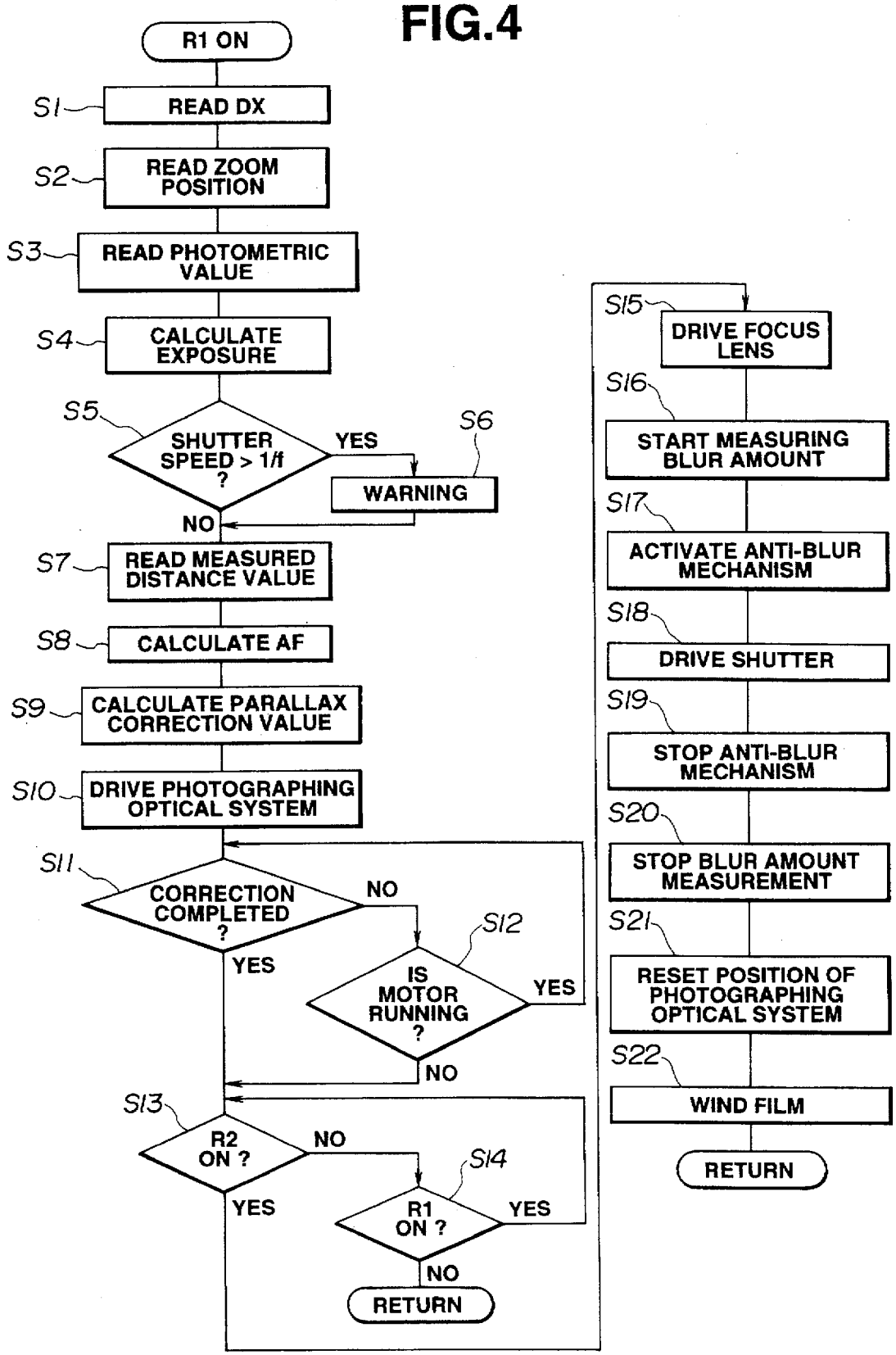
FIG. 4 is a flowchart showing the operation of the camera of the first embodiment at the time of photographing.

FIG. 4 is the flowchart illustrative of the operation of the camera of the first embodiment at the time of photographing.

The moment the first release switch R1 is turned ON, the program shown in the flowchart is initiated and the DX code of the magazine is first read through the DX reader 43 (step S1), the zoom position of the photographing lens 12 is then detected by the zoom position detector 42 (step S2), the brightness of a subject is detected by the photometric section 41 (step S3), and the microprocessor 9 performs the exposure computation according to the aforesaid information (step S4).

Then, the shutter speed obtained from the exposure computation in step S4 is compared with an inverse number 1/f of a zoom focal length f (step S5). If the shutter speed is slower than the value 1/f, then the PCV 48 is driven to issue audible warning (step S6) to give warning to a photographer to urge the photographer to be careful not to cause a blur when taking a picture. It is easily understood that an LED or the like in the finder, in place of the PCV, may be used to issue such warning.

When step S6 terminates or if the shutter speed is found to be faster than 1/f in step S5, in the AF sequence, the distance to the subject measured by the AF distance measuring section 40 (step S7) is read and the AF computation is carried out to decide the lens drawing-out amount of the photographing optical system 12 (step S8).

In the following parallax correcting sequence, the parallax correction amount, i.e. the tilt angle of the photographing optical system 12, is calculated from the measured distance value read in step S7 (step S9) and the photographing optical system 12 is driven by the motors 17 and 20 to the determined angle (step S10).

The then tilt angle of the optical axis of the photographing optical axis 12 for correcting the parallax is determined by the expression given below:

When the photographing optical axis is parallel to the optical axis of the finder in the initial state;

Photographing Optical Axis Tilt Angle=arctan (S/L)

where S denotes the distance between the two optical axes and L denotes the photographing distance to the subject.

It is also possible to divide the photographing distance into several steps and establish a fixed parallax correction amount, i.e. the photographing optical axis tilt angle in this case, for each of the levels so that the parallax can be corrected in steps.

In a camera with variable focal length which has a zoom lens, the parallax may be corrected only for a great focal length.

The program then determines whether the correction of the parallax has been completed or not (step S11) and if the determination result is negative, then it determines whether the motors 17 and 20 are running or not (step S12); if the motors 17 and 20 are found to be running, then the program goes back to step S11. If the motors 17 and 20 are not running, disabling the drive, because the photographing optical axis 12 is being held by hands or for some other reason, then the program terminates the parallax correction sequence and proceeds to step S13 for the next photographing sequence.

If the program determines in step S11 that the parallax correction has been completed, then it determines whether the second release switch R2 has been turned ON or not (step S13).

If the program finds that the second release switch R2 has not been ON, then it continues to wait for the second release switch R2 to be turned ON until the first release switch R1 is turned OFF (step S14). If the first release switch R1 is turned OFF in step S14, then the program exits from this routine and goes back to a main routine of the camera which is not shown.

If the second release switch R2 is turned ON in step S13, then the program moves to the photographing sequence to drive the focus lens of the photographing optical system 12 (step S15), and to detect and read the blur angular velocity of the camera with respect to the earth through the angular velocity sensors 34, 35 (step S16). Based on the detection result, the driving operation steps of the blur prevention photographing optical system (step S17) to be described later is begun in sequence so as to drive the shutter to implement exposure (step S18).

The motors 17 and 20 are driven to drive the aforesaid blur prevention photographing optical system which is continued to be driven at least during the exposure so that the photographing optical system 12 relatively produces, with respect to the camera, the angular velocity which is equal in magnitude to, but opposite in direction from, the blur angular velocity of the camera with respect to the earth which has been obtained in step S16 stated above. This offsets the blur action, causing almost no change in the angular position of the photographing optical system 12 in relation to the earth.

If the driving operation cannot be implemented because of the photographing optical system 12 being held in hands or for some other reason, then the blur preventing operation is interrupted to drive the shutter (not illustrated).

After the drive of the shutter in step S18 is completed, the drive of the blur prevention photographing optical system is stopped (step S19), the reading of the blur angular velocity is stopped (step S20), the position of the photographing optical system 12 is reset (step S21), and the film is wound by one frame (step S22) before the release sequence is terminated.

Figure 6:
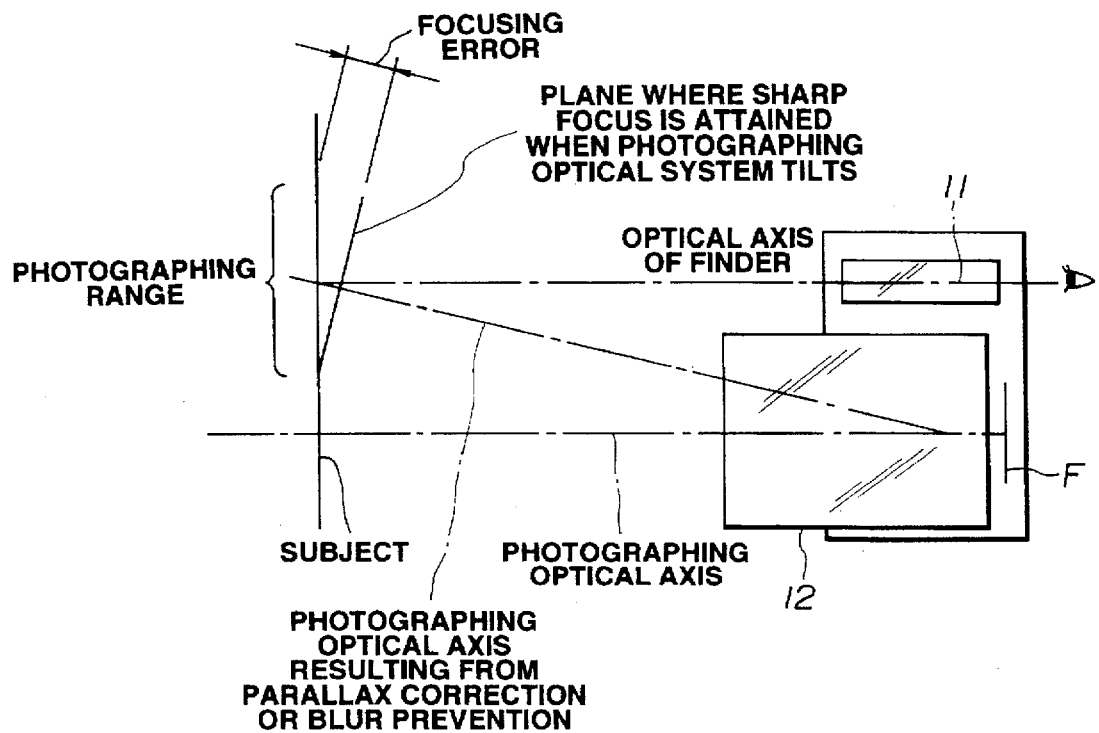
FIG. 6 is a side view for illustrating a focal error produced when a photographing optical axis is tilted in the first embodiment.

As described above, the parallax correction and the blur prevention accomplished by tilting the photographing optical system 12 is accompanied by a slight focal error as shown in FIG. 6. Although this focal error hardly leads to a problem in printing in the standard snapshot size (e.g. 8 cm×12 cm), which is the stand print size, the drive amount of the focus lens of the photographing optical system 12 should preferably be corrected for a better result.

More specifically, it is conceivable to employ focal error correcting means for making focal error correction by driving the correcting lens in the direction of the optical axes or driving it so that it is decentered from the optical axes.

The focal error becomes more marked as the distance to the subject grows shorter because the tilt angle of the photographing optical axis increases. By making use of the fact that the intensity of the light of strobe reaching the subject increases as the distance grows shorter, the strobe may be forced to emit light when the optical axes are tilted for correcting the parallax. This causes the aperture of the photographing optical system 12 to be smaller with consequent greater depth of field, thereby allowing the focal error to be controlled.

In the embodiment described above, the means for correcting the parallax employs the means for tilting the photographing optical axis, and to be more specific, the means for tilting the photographing optical system and the film together. The parallax correcting means to which the present invention can be applied is not limited thereto; the present invention can be applied also to parallax correcting means designed to move the photographing optical axis in parallel or parallax correcting means designed to move the film in parallel with the photographing optical axis fixed.

The methods for shifting the position of the photographing optical axis are conceptually illustrated in FIG. 7A, FIG. 7B, FIG. 7C, FIG. 7D, FIG. 7E, FIG. 7F, and FIG. 7G.

In addition to the methods stated above, the following methods are considered for tilting the photographing optical axis.

Figure 7A:
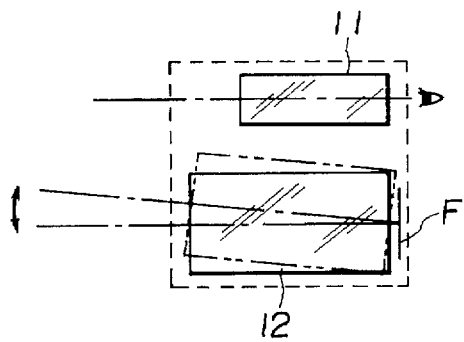
FIG. 7A is illustrative of a first example of a method whereby the photographing optical axis is shifted in the first embodiment.

In the method shown in FIG. 7A, only the entire photographing optical system 12 is tilted without moving the finder optical system 11, film F, etc. in relation to the camera main body.

Figure 7E:
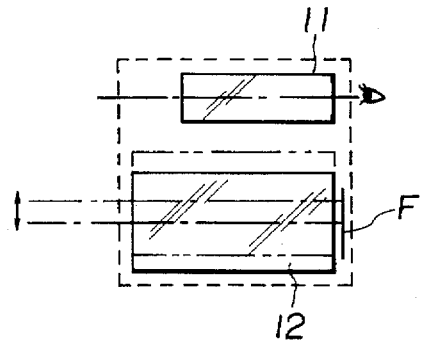
FIG. 7E is illustrative of a fifth example of a method whereby the photographing optical axis is shifted in the first embodiment.
Figure 7B:
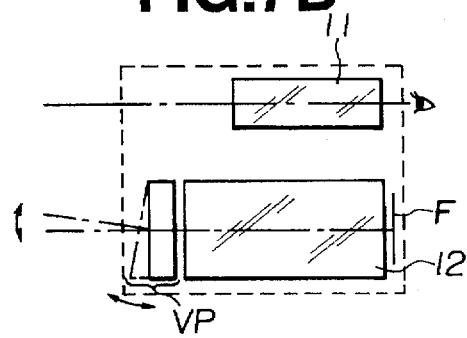
FIG. 7B is illustrative of a second example of a method whereby the photographing optical axis is shifted in the first embodiment.

In the method shown in FIG. 7B, a prism VP with variable apex angle is provided in front of the photographing optical system 12 and the tilt angle of the prism VP is changed.

Figure 7F:
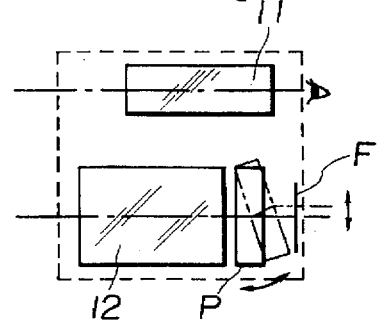
FIG. 7F is illustrative of a sixth example of a method whereby the photographing optical axis is shifted in the first embodiment.
Figure 7C:
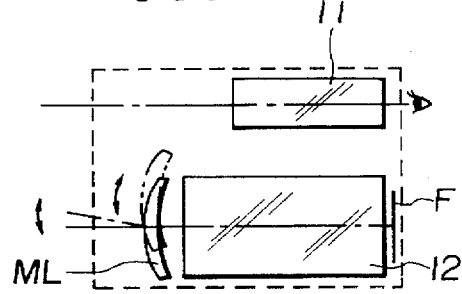
FIG. 7C is illustrative of a third example of a method whereby the photographing optical axis is shifted in the first embodiment.

In the method shown in FIG. 7C, a movable lens ML is provided in front of the photographing optical system 12 and the lens ML is decentered to tilt the optical axis.

Figure 7G:
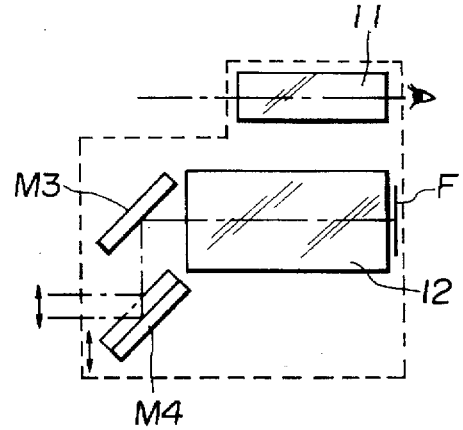
FIG. 7G is illustrative of a seventh example of a method whereby the photographing optical axis is shifted in the first embodiment.
Figure 7D:
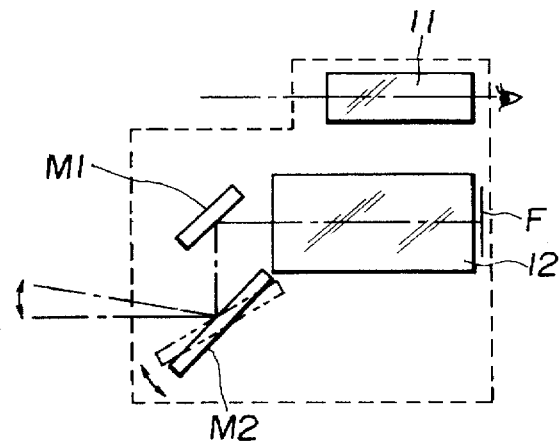
FIG. 7D is illustrative of a fourth example of a method whereby the photographing optical axis is shifted in the first embodiment.

In the method shown in FIG. 7D, a first mirror M1 with the reflecting surface thereof tilted downward by about 45 degrees is provided in front of the photographing optical system 12 and a second mirror M2 with the reflecting surface tilted upward by about 45 degrees is further disposed under the first mirror M1. The second mirror M2 is swung to tilt the optical axis.

The following methods are conceivable for moving the photographing optical axis in parallel.

In the method shown in FIG. 7E, the entire photographing optical system 12 is moved so that the new optical axis is parallel to the previous optical axis, without moving the finder optical system 11, film F, etc. in relation to the camera main body.

In the method shown in FIG. 7F, a parallel plane board P is provided on the photographing optical axis between the photographing optical system 12 and film F, and the parallel plane P is tilted to move the photographing optical axis in parallel.

In the method shown in FIG. 7G, a mirror M3 with the reflecting surface thereof tilted downward by about 45 degrees is provided in front of the photographing optical system 12 and a mirror M4 with the reflecting surface tilted upward by about 45 degrees is further disposed under the mirror M3. The mirror M4 is moved so that the new photographing optical axis directed in M4 is parallel to the original optical axis directed into M4.

It is also possible to move the photographing optical axis in parallel by combining a plurality of prisms with variable apex angles shown in FIG. 7B, although this method is not illustrated.

It is further possible to move the photographing optical axis in parallel by swinging the mirror as illustrated in FIG. 7D.

It is still further possible to use various combinations of the methods for correcting the parallax by shifting the position of the photographing optical axis and moving the film in parallel to suppress the blur in the direction which orthogonally intersects with the optical axis shifting direction although the methods are not illustrated herein.

It is apparent that other embodiments and modifications are possible without departing from the spirit or essential character of the present invention.

For instance, the structure of the first embodiment of the present invention can apparently be applied to a photographing apparatus which employs image sensing means composed of such an image sensing device as CCD in place of film F so as to electrically capture the image of a subject.

According to the first embodiment, the optical axis shifting means for correcting parallax before exposure serves also as the blur preventing means during exposure. This makes it possible to achieve a user-friendly, inexpensive, small camera.

FIG. 8 to FIG. 13 illustrate the second embodiment of the present invention. In the second embodiment, the components having the same functions as those of the first embodiment are given identical reference numerals and the explanation thereof will be omitted. The description will be focused only on different aspects.

Figure 13:
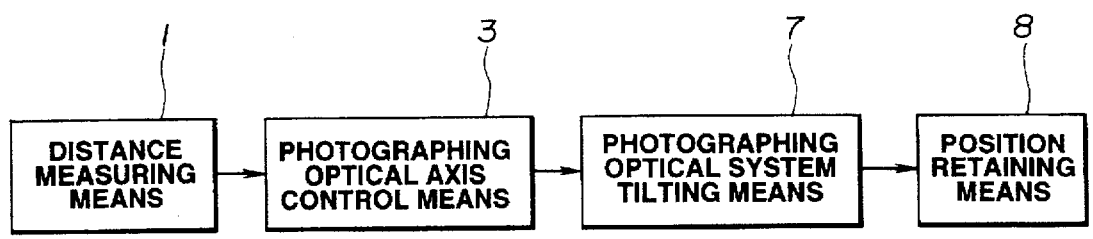
FIG. 13 is a block diagram illustrating the basic concept of the camera of the second embodiment.

The basic concept of the camera related to the second embodiment will be first described with reference to FIG. 13. The camera, i.e. the photographing apparatus, is constructed of distance measuring means 1, photographing optical axis control means 3 for controlling the tilt angle of the photographing optical axis with respect to the finder optical axis in accordance with the output of the distance measuring means 1, photographing optical system tilting means 7 for actually tilting the photographing optical system under the control by the photographing optical axis control means 3, and position holding means 8 for retaining the position of the photographing optical system, which has been tilted by the photographing optical system tilting means 7, with respect to an immovable object, e.g. ground.

In this camera, the photographing optical system is tilted by the photographing optical system tilting means 7 to eliminate the difference between the field of view of the finder and the exposure range of the photographing optical system in accordance with the distance measurement data obtained from the distance measuring means 1. The position holding means 8 retains the position of the photographing optical system, which has been tilted by the photographing optical system tilting means 7, in relation to an immovable object such as the ground so that the position of the photographing optical system is not disturbed by the shaking of the camera main body.

The second embodiment employs a gyro mechanism as the position holding means 8.

Figure 8:
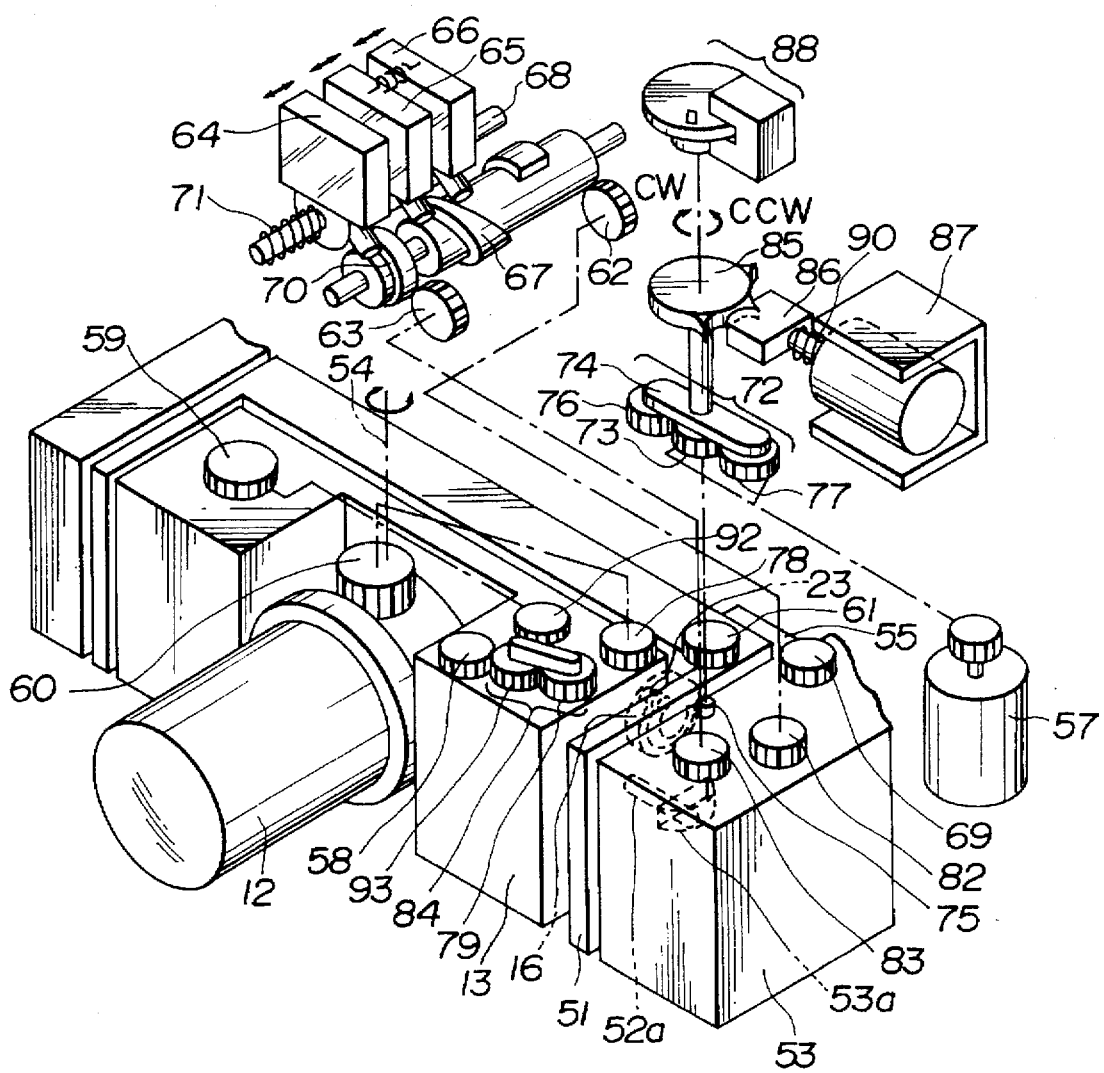
FIG. 8 is an exploded perspective view showing the structure of a camera of a second embodiment in accordance with the present invention.
Figure 9A:
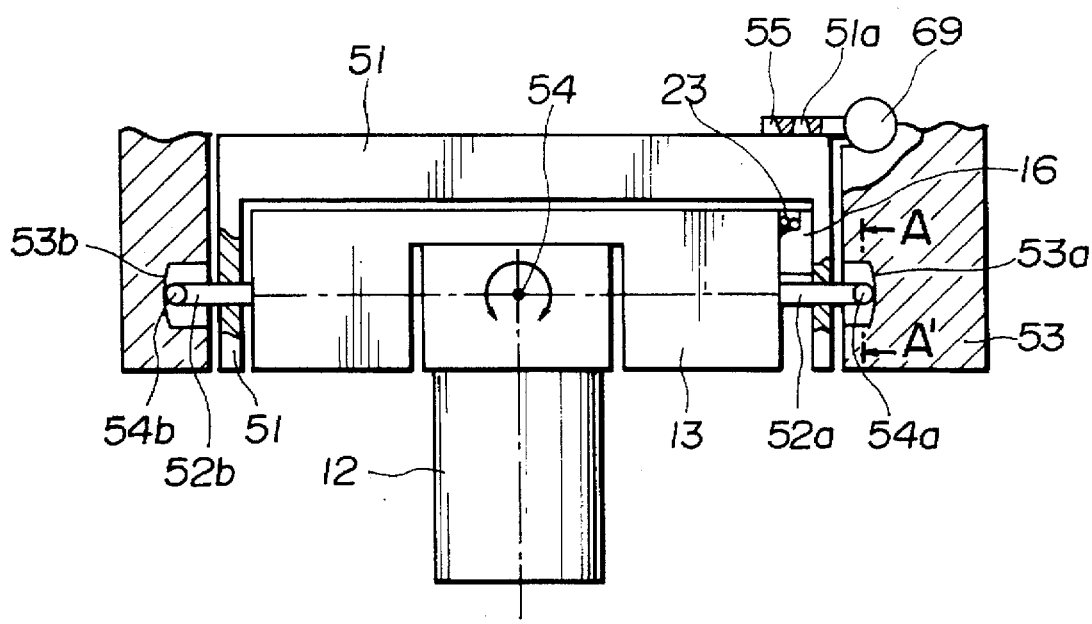
FIG. 9A is a top plan view (partially a cross-sectional view) showing the structure of the camera of the second embodiment.
Figure 9B:
FIG. 9B is a top plan view of an essential section wherein the lock mechanism shown in FIG. 9A has been disengaged.
Figure 9C:
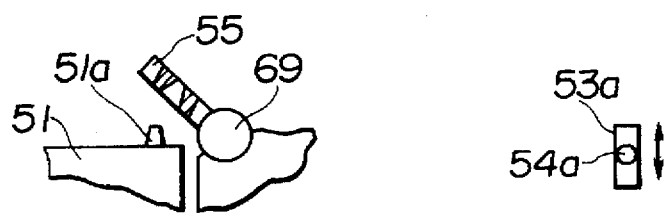
FIG. 9C is a side view of the essential section with the steel ball of FIG. 9A shown engaged in the concavity shown in FIG. 9A.

Based on the concept described above, the second embodiment will be described in detail. FIG. 8 is an exploded perspective view showing the structure of a camera of the second embodiment; FIG. 9A is the top plan view (partially a cross-sectional view) showing the structure of the camera of FIG. 8; FIG. 9B is the top plan view of the essential section wherein the lock mechanism shown in FIG. 9A has been disengaged; and FIG. 9C is the side view of the essential section with the steel ball engaged in the concavity shown in FIG. 9A.

The photographing optical system 12 is provided nearly at the center on the front of the camera, a zoom drive gear 60 being disposed on the circumferential surface of the photographing optical system 12 at rear top.

The photographing optical system 12 is integrally fixed to the film holding member 13. The film holding member 13 holds a film, not shown, in a predetermined position at the rear of the photographing optical system 12; it has shafts 52a, 52b jutting out on both sides thereof and also the pin 23 which engages with the cam groove of the captive cam 16.

Provided on the top surface of the film holding member 13 are a winding drive gear 58 for winding the film to the right side of the photographing optical system 12 in the drawing and a rewinding drive gear 59 for rewinding the film to the left side of the photographing optical system 12.

The winding drive gear 58 is disposed in a position where it can be selectively meshed with a planet gear 93. The planet gear 93 meshes with a sun gear 79 and it is also linked to the sun gear 79 via a planet arm to constitute a planet clutch 84.

A gear 92, which meshes with the rewinding drive gear 59 via a train of gears (not shown) is also disposed in the position where the planet clutch 84 is selectively meshed with the planet gear 93.

In the vicinity of the gear 92, there is provided a gear 78 which engages with the zoom drive gear 60 and which can be engaged with a planet clutch 72 to be discussed later.

The film holding member 13 is rotatably supported around the shafts 52a, 52b in relation to a gyro unit 51 to be discussed later; it is driven and turned about the shafts 52a, 52b in relation to the gyro unit 51 by the captive cam 16.

As shown in FIG. 9A and FIG. 9C, the shafts 52a, 52b rest in concavities 53a, 53b so that they can be turned about a virtual axis 54 in relation to a main body 53 which is made integral with a camera outer jacket not shown. The virtual axis 54 passes through the intersection of the shafts 52a, 52b, and the photographing optical axis and it is perpendicular to these shafts and the optical axis.

Steel balls 54a, 54b are respectively provided on the ends of the shafts 52a, 52b to allow the shafts 52a, 52b to smoothly rotate about the virtual axis 54. The aforesaid concavities 53a, 53b which are in contact with the steel balls 54a, 54b have curved surfaces.

Thus, the photographing optical system 12, the film holding member 13, and the gyro unit 51 can be turned together around the virtual axis 54 and they can also be rotated using the shafts 52a, 52b as the rotation axes.

Furthermore, since the main body 53 is made integral with the camera outer jacket, the photographing optical system 12, the film holding member 13, and the gyro unit 51 are integrally supported so that they can be turned about the two axes with respect to the camera outer jacket which is not shown.

It is apparent that there are various shaft supporting methods as those described, for example, in the first embodiment.

A parallax correction drive gear 61, which meshes with the captive cam 16 via a train of gears (not shown), is further provided on the side corner at the rear right and on the top surface of the gyro unit 51.

As shown in FIG. 9A, a lock mechanism 55 is rotatably supported by a lock mechanism drive gear 69 on the main body 53 so as to retain an engaging projection 51a jutting out from the rear end surface of the gyro unit 51.

With such an arrangement, the photographing optical system 12, the film holding member 13, and the gyro unit 51 are integrally fixed to the camera outer jacket except at the time of film exposure. At the time of the film exposure, as shown in FIG. 9B, the lock mechanism 55 unlocks the aforesaid components from the camera outer jacket and their position is maintained in a manner to be discussed later by the force generated by the gyro unit 51.

Also provided on the top surface of the main body 53 are a gear 82 which meshes with a finder zoom drive gear 62 via a train of gears (not shown) and a gear 83 which meshes with a diopter correction gear 63 to be discussed later via a train of gears (not shown), the gears 82 and 83 being disposed to engage with a planet clutch 72 to be described later.

The planet clutch 72 is constituted by two planet gears 76, 77 each of which meshes with a sun gear 73 located between them, the planet gears 76, 77 being rotatably mounted on both ends of a planet arm 74. The sun gear 73 and the planet arm 74 are rotatably mounted in relation to a shaft 75 fixed to the main body 53.

The planet gear 76 or the planet gear 77 of the planet clutch 72 has the sun gear 79 of the planet clutch 84, the gear 78, the parallax correction drive gear 61, the lock mechanism drive gear 69, and the gears 82, 83 which can all be selectively meshed therewith.

The sun gear 73 is driven by a motor 57. This means that the motor 57 drives the winding drive gear 58, the rewinding drive gear 59, the zoom drive gear 60, the parallax correction drive gear 61, the finder zoom drive gear 62, the diopter correction lens drive gear 63, and the lock mechanism drive gear 69.

The revolution state of the motor 57 is detected through a photo interrupter (not shown) through a train of gears which are not illustrated.

A ratchet 85 is coaxially and integrally mounted on the rotation shaft of the planet arm 74. A retaining section 86 is provided near the ratchet 85, the retaining section 86 being driven by a solenoid plunger 87 while it is urged by a spring 90.

More specifically, when one of the teeth of the ratchet 85 is engaged with the retaining section 86, the rotation of the planet arm 74 is restricted. When the retaining section 86 is drawn in by the solenoid plunger 87 to be disengaged from the tooth, the planet arm 74 is allowed to turn.

The ratchet 85 has coupled thereto a disc with a hole therein which rotates as the ratchet 85 rotates. The rotation of the disc is detected through a photo interrupter 88 so as to detect the rotational angle of the ratchet 85. It is apparent that the means for detecting the rotational angle of the ratchet 83 is not limited thereto; detecting means of other structures may be used.

The finder optical system is constituted by a first lens 64, a second lens 65, and a third lens 66 of the finder, a prism which is not shown, a field mask, an eye piece, etc.

The first lens 64, the second lens 65, and the third lens 66 of the finder are slidably supported by a guide shaft 68. A spring 71 is inserted in the guide shaft 68 on the front of the optical axis of the first lens 64 of the finder.

Provided nearly in parallel to the guide shaft 68 is a shaft member on which a diopter correction cam 70 and a finder zoom cam 67 are coaxially and rotatably mounted. The projection of the first lens 64 of the finder engages with the diopter correction cam 70 by the urging force of the spring 71 to position the first lens 64. Likewise, the projections of the second lens 65 and the third lens 66 of the finder engage with finder zoom cam 67 by holding the cam 67 between them by the urging force of the springs provided on the lenses 65, 66 to position the lenses.

The first lens 64 of the finder moves in the direction of the optical axis as the diopter correction cam 70 rotates so as to correct a dioptic error which takes place in the finder optical system due to a change in the distance to a subject. More specifically, in the finder of a compact camera or the like, the image forming position of the subject obtained through the finder is moved longitudinally in the direction of the optical axis whenever the distance of the subject changes. This prevents the blurring of a finder image caused by the mismatch of the eye focus point and the image forming position of the subject.

The second lens 65 and the third lens 66 of the finder are magnification varying lenses in the finder optical system and they are driven to change the positional relationship in the direction of the optical axis as the finder zoom cam 67 rotates, thereby changing the magnification of the finder.

The finder zoom drive gear 62 meshes with the finder zoom cam 67 and the diopter correction lens drive gear 63 meshes with the diopter correction cam 70. As described above, the finder zoom drive gear 62 meshes with the gear 82 via a train of gears (not shown) and the diopter correction lens drive gear 63 meshes with the gear 83 via a train of gears (not shown).

The working principle of the gyro unit will now be described with reference to FIG. 11.

The gyro unit has a disc-shaped rotor J1 which is supported in a manner that it is allowed to precess; the rotor J1 rotates at high speed by the driving force of a motor Jm which is coaxially mounted.

The rotor J1 and the motor Jm are attached to a U-shaped first supporting member and the first supporting member is also attached to a U-shaped second supporting member in a manner that it is allowed to rotate about shaft b.

In such a structure, with the rotor J1 rotating at high speed, when rotational force M illustrated is applied around shaft a with respect to the gyro unit, the precession of rotor J1 around shaft b causes force M', which matches rotational force M, to be generated.

The gyro unit 51 constructed based on the principle stated above will be described in more detail in conjunction with FIGS. 10, 10A and 10B.

Figure 11:
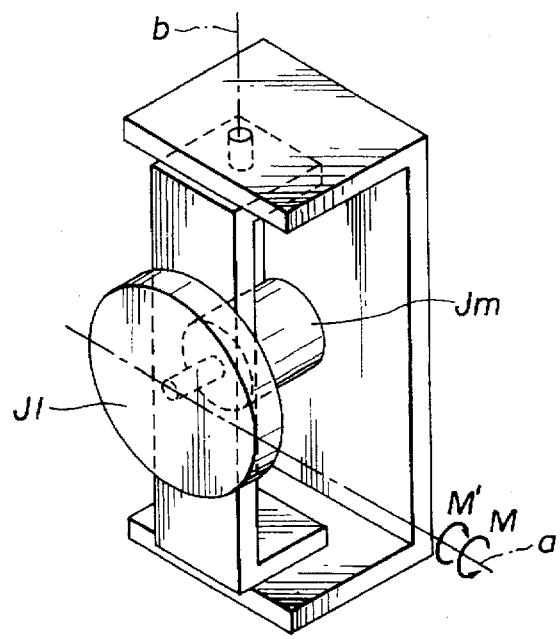
FIG. 11 is a perspective view for explaining the principle of the gyro unit of the second embodiment.

As illustrated, the gyro unit 51 has two pairs of the gyro units of the type shown in FIG. 11, the gyro units being disposed so that the rotation axes of the precession thereof orthogonally intersect with each other.

As indicated by reference characters A, B, and C, the gyro unit 51 is provided with retaining mechanisms J2a, J2b for retaining the precession of rotors J1a, J1b.

The retaining sections J3a, J3b of the retaining mechanisms J2a, J2b are driven by solenoid plungers J4a, J4b to engage or disengage discs J5a, J5b which have engaging projections on the circumferential surfaces thereof.

Thus, when the retaining sections J3a, J3b are in engagement with the discs J5a, J5b, the rotors J1a, J1b are not allowed to precess and they are fixed in predetermined positions at the same time.

The gyro unit 51, the photographing optical system 12, and the film holding member 13 are supported rotatably about the two axes as described above; and when an external force for rotating them about the axes is applied, the reaction force matching the external force is generated by the gyro unit 51 to cancel the external force.

The reaction force is generated at the time of film exposure or the like when the lock mechanism 55 is unlocked and the gyro unit 51 is not fixed to the outer jacket of the camera, thus making it possible to maintain the positions of the photographing optical system 12 and the film holding member 13 without fixing them on the outer jacket of the camera. This permits the prevention of the blurring of an exposure image without being affected by the movement of the camera caused by camera shake.

It is obvious that the structure of the gyro unit is not limited to the one described above but various other modifications are possible.

The operation of the camera of the second embodiment will be described with reference to FIG. 8, FIG. 10, etc., the description being focused mainly on the zooming operation.

In the initial state, the planet gears 76, 77 of the planet clutch 72 are respectively meshed with the parallax correction drive gear 61 and the diopter correction drive gear 83.

The rotors J1a, J1b of the gyro unit 51 are rotated at all times regardless of the releasing operation because they must be rotated at high speed to obtain better blur prevention.

Figure 10:
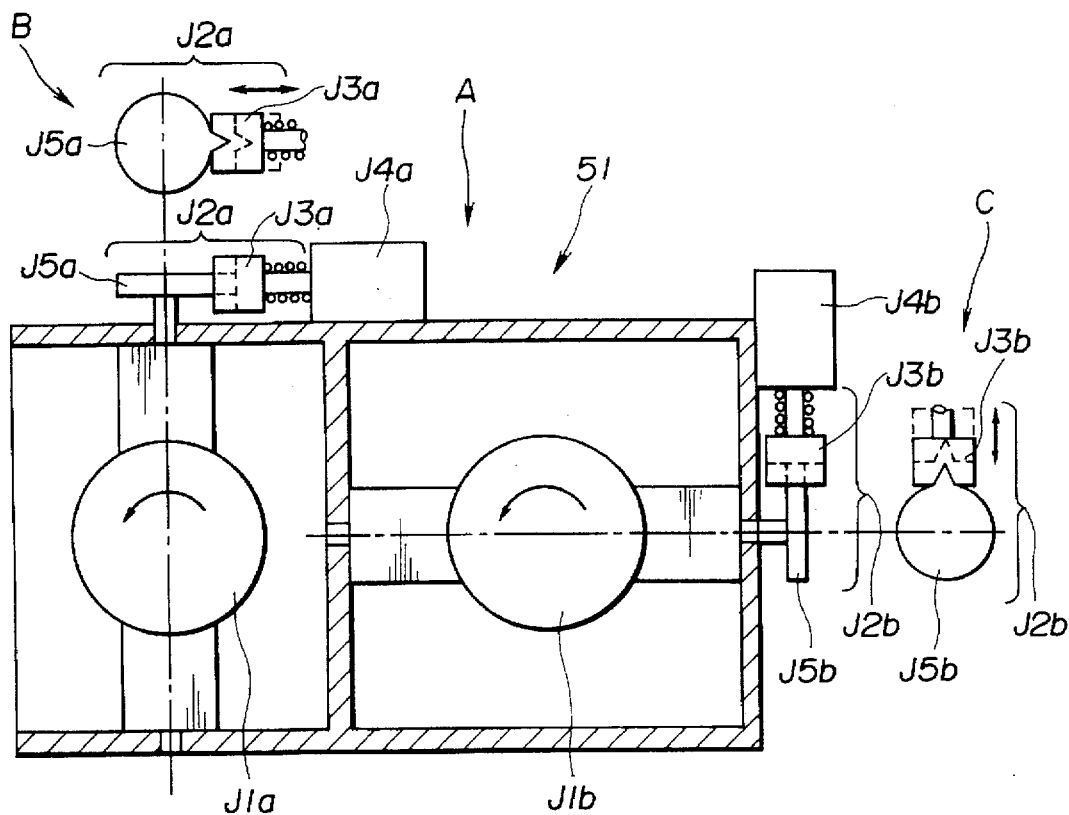
FIG. 10 presents a front view showing the structure of a gyro unit of the second embodiment.

At this time, the precession of the rotors J1a, J1b is retained by the retaining mechanisms J2a, J2b shown in FIG. 10 so that the force generated by the gyro unit 51 does not interfere with the framing of the camera.

Pressing a zoom button (not shown) provided on the camera causes the solenoid plunger 87 to be energized to draw in the retaining section 86, disengaging the retaining section 86 from the tooth of the ratchet 85.

The motor 57 then drives the sun gear 73 to rotate it, thereby turning the planet arm 74 counterclockwise in FIG. 8.

The solenoid plunger 87 is deenergized as soon as it is confirmed by the signal from the photo interrupter 88 that the planet arm 74 has reached the position where the planet gear 76 engages with the zoom drive gear 78.

This causes the retaining section 86 to be engaged with a tooth of the ratchet 85 again by the urging force of the spring 90, and the position of the planet arm 74 is fixed so as to transmit the driving force of the planet gear 76 to the zoom drive gear 78.

At this time, the other planet gear 77 is in engagement with the finder zoom drive gear 82 and therefore the rotation of the sun gear 73 is also transmitted to gear 82. This arrangement enables the zooming of both the photographing optical system 12 and the finder optical system to be performed at the same time.

Upon completion of the operation of the zooming button, the solenoid plunger 87 is actuated to release the engagement between the ratchet 85 and the retaining section 86, making the planet arm 74 rotatable.

The motor 57 is then driven to turn the planet arm 74 clockwise in FIG. 8, thereby to mesh the planet gears 76, 77 of the planet clutch 72 with the parallax drive gear 61 and the diopter correction drive gear 83, respectively while referring to the signals received from the photo interrupter 88. The retaining section 86 is engaged with the ratchet 85 again to go back to the initial state before finishing the zooming operation.

Figure 12:
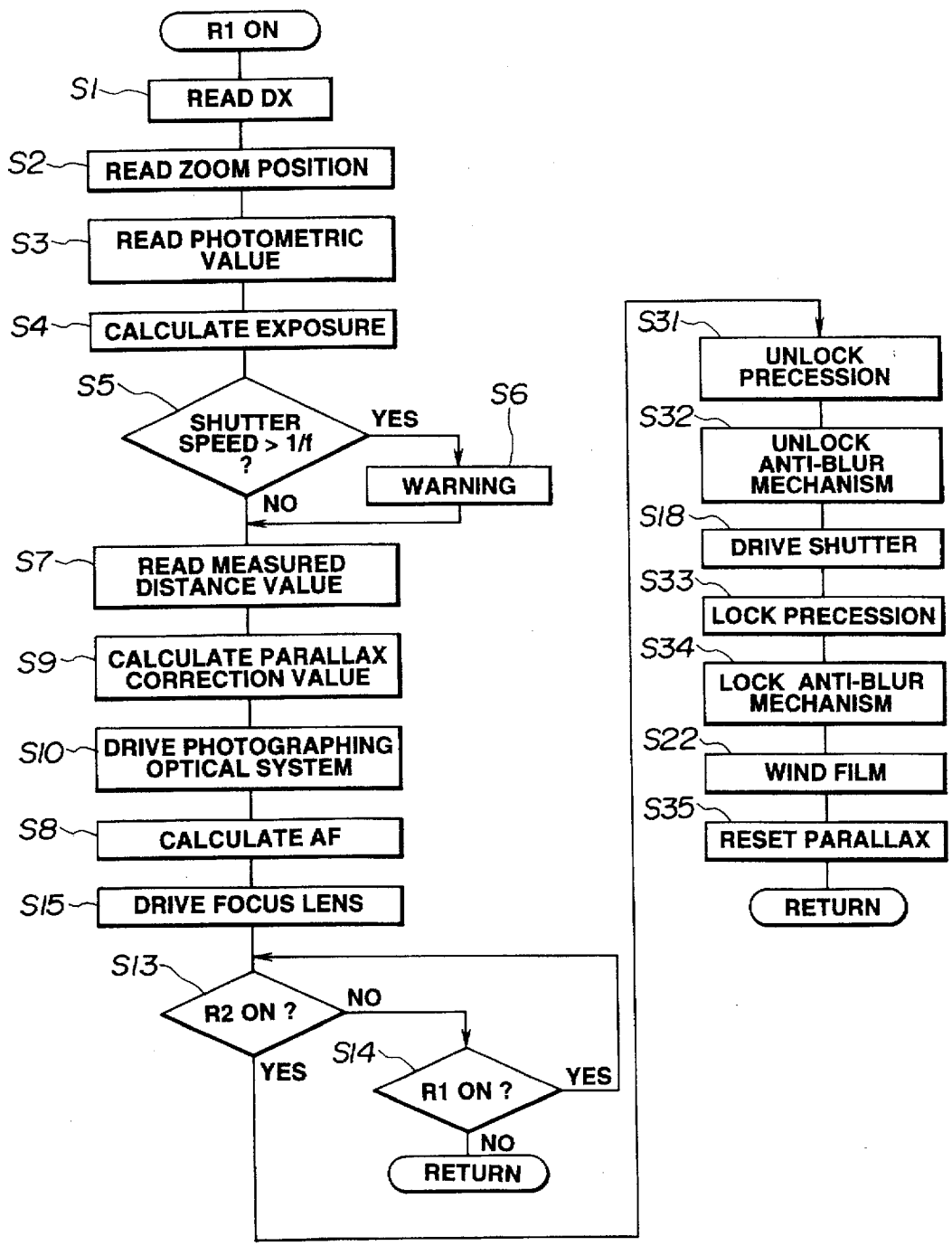
FIG. 12 is a flowchart illustrative of the operation of the camera of the second embodiment at the time of photographing.

FIG. 12 is the flowchart showing the photographing operation of the camera of the second embodiment.

The same parts as those of the first embodiment are assigned the same reference numerals and the explanation thereof will be omitted.

The moment the first release switch R1 is turned ON, the program shown in this flowchart begins.

When step S1 to S6 have been implemented (same as steps 51 to 56 in FIG. 4), the measured distance to a subject is read from the AF distance measuring section 40 (step S7 same as FIG. 4). In the following parallax sequence, the parallax correction amount is computed (step S9) from the measured distance value which has been read in step S7.

The captive cam 16 is then rotated by the motor 57 to drive the photographing optical system 12 and the film holding member 13 until the amount computed in step S9 (same as S9 in FIG. 4) is obtained (step S10). At this point, the planet gear 76 of the planet clutch 72 is in engagement with the parallax correction gear 67 and the other planet gear 77 of the planet clutch 72 is also in engagement with the diopter correction drive gear 83, therefore, the diopter is also corrected in accordance with the measured value.

The AF computation is performed to decide the movement of the focus lens of the photographing optical system 12 (step S8 same as S8 in FIG. 4) and the focus lens of the photographing optical system 12 is driven according to the AF computation result (step S15).

Then, the program determined whether the second release switch R2 is ON or not (step S13) and if the second release switch R2 is not ON, then the program waits for the second release switch R2 to come ON until the first release switch R1 turns OFF (step S14). If the first release switch R1 turns OFF in step S14, then the program exits from this routine and goes back to the main routine (not shown) of the camera.

If the second release switch R2 is turned ON in step S13, then the program moves to the photographing sequence wherein it first releases the lock of the retaining mechanisms J2a, J2b (see FIG. 10) which have been locked to prohibit the precession of the gyro unit 51 (step S31).

The solenoid plunger 87 is then actuated to release the retaining section 86 from the ratchet 85 and the motor 57 is driven to rotate the planet arm 74 clockwise in FIG. 8. The ratchet 85 is retained by the retaining section 86 again to transmit the driving force to the locking mechanism drive gear 69 so as to release the gyro unit 51 from the lock mechanism 55 (step S32).

As described above, the positions of the photographing optical system 12 and the film holding member 13 are maintained by the force generated by the gyro unit 51 without their being fixed to the outer jacket of the camera, thus rendering a condition wherein the blur of the photographing image can be prevented even if the camera shakes.

Under this condition, the shutter is driven to implement exposure (step S18). Upon completion of the exposure, the solenoid plungers J4a, J4b are driven to lock the retaining mechanisms J2a, J2b so as to prohibit the precession of the gyro unit, thereby setting the rotors J1a, J1b back in the predetermined positions (step S33).

The gyro unit 51 is locked again by the lock mechanism 55, so that the gyro unit 51 is fixed in the predetermined position again with respect to the outer jacket of the camera (step S34).

In the following sequence for winding the film by one frame, the retaining section 86 is released from the ratchet 85 again, the motor 57 is driven to rotate the planet arm 74 clockwise in FIG. 8. When the sun gear 79 meshes with the planet gear 76, the ratchet 85 is locked again by the retaining section 86.

Rotating the sun gear 79 counterclockwise in FIG. 8 causes the driving force of the sun gear 79 to be transmitted to the winding drive gear 58, thus winding the film by one frame (step S22).

The retaining section 86 is disengaged from the ratchet 85 and the planet arm 74 is turned clockwise in FIG. 8 until the planet gears 76, 77 mesh with the parallax drive gear 61 and the diopter correction drive gear 83, respectively, then the ratchet 85 is locked again by the retaining section 86.

At this point, when the parallax correction drive gear 61 is driven to set the photographing optical system 12 and the film holding member 13 back in the home positions thereof, the diopter correction drive gear 83 rotates in the same manner as that in step S10 stated above so as to set the diopter correction lens, i.e. the first lens 64, also back to the home position thereof (step S35).

This completes the release sequence.

It is obvious that the structure of the clutch used in this embodiment is not limited to the one described above; various other structures are possible.

Further, in the embodiments described above, the position of the photographing optical system in relation to an immovable object is maintained by the force generated by the gyro unit, thereby to suppress the camera shake; the present invention, however, is not limited to this method. The present invention can also be applied to a blur control means in which a spring, damper, or the like may be used to prevent the vibration of the outer jacket of the camera from being transmitted to the photographing optical system, thereby maintaining the position of the photographing optical system with respect to an immovable member.

Moreover, it is apparent that various other modifications are possible without departing from the spirit or essential character of the present invention.

It is obvious that in the second embodiment, an image sensing means composed of an image sensing device such as a CCD may replace film F to constitute a photographing apparatus which electrically captures the image of a subject.

According to the second embodiment, nearly the same advantages as those of the first embodiment are provided and the parallax correction means serves also as the blur suppressing means, thus achieving a user-friendly, inexpensive, small camera.

In this invention, it is apparent that working modes different in a wide range can be formed on this basis of this invention without departing from the spirit and scope of the invention. This invention is therefore not restricted by any specific embodiment except as may be limited by the appended claims.

What is claimed is:

1. A photographing apparatus comprising:
    a photographing optical system;
    a finder optical system having an optical axis which is different from an optical axis of said photographing optical system;
    distance measuring means for measuring a distance to an object to be photographed; and
    diopter correcting means for changing optical positions of a film or an image sensing device and said photographing optical system relative to the finder optical system responsive to an output of said distance measuring means to correct for parallax prior to photographing; wherein said diopter correcting means provides image blur correction at a time of exposure of a film or an image sensing device responsive to a shutter operation and responsive to sensors detecting movement of the optical system.

2. A photographing apparatus according to claim 1, wherein said diopter correcting means moves said photographing optical system so that optical axes of an original position and a changed position, although displaced from one another, are substantially in parallel.

3. A photographing apparatus according to claim 1, further comprising:
    detecting means for detecting inoperativeness of said diopter correcting means or said image blur correcting means; and
    stopping means for stopping operation of said diopter correcting means or said image blur correcting means; wherein,
    if said detecting means detects the inoperativeness of said diopter correcting means or said image blur correcting means, then said stopping means stops operation of said diopter correcting means or said image blur correcting means, and exposure of the film or the image sensing device is performed without carrying out a diopter correction of an image blur correction.

4. A photographing apparatus according to claim 1, wherein said diopter correcting means tilts a photographing optical axis by shifting a position of an optical device which is a part of said photographing optical system.

5. A photographing apparatus according to claim 4, wherein said diopter correcting means tilts a photographing optical axis by changing an apex angle of a prism with a variable apex angle provided in said photographing optical system.

6. A photographing apparatus according to claim 4, wherein said diopter correcting means tilts a photographing optical axis by decentering an optical device provided in said photographing optical system.

7. A photographing apparatus according to claim 4, wherein said diopter correcting means tilts a photographing optical axis by swinging a mirror provided in said photographing optical system.

8. A photographing apparatus according to claim 4, further comprising means for correcting or reducing a focal error which results from a shift in position of said photographing optical system.

9. A photographing apparatus according to claim 1, wherein said diopter correcting means moves a photographing optical axis so that an original position and a changed position of the photographing optical axis remain substantially in parallel by shifting a position of an optical device which is a part of said photographing optical system.

10. A photographing apparatus according to claim 1, wherein said diopter correcting means moves a photographing optical axis so that an original position and a changed position of the photographing optical axis remain substantially in parallel by changing an apex angle of a prism with variable apex angle provided in said photographing optical system.

11. A photographing apparatus according to claim 1, wherein said diopter correcting means moves a photographing optical axis so that an original position and a changed position of the photographing optical axis remain substantially in parallel by decentering an optical device provided in said photographing optical system.

12. A photographing apparatus according to claim 9, wherein said diopter correcting means moves a photographing optical axis so that an original position and a changed position of the photographing optical axis remain substantially in parallel by moving a mirror provided in said photographing optical system.

13. A photographing apparatus according to claim 9, wherein said diopter correcting means moves a photographing optical axis in parallel by moving a mirror provided in said photographing optical system so that a surface of the mirror in an original position and a changed position are substantially in parallel.

14. A photographing apparatus according to claim 1, further comprising a driving means for shifting a position of an optical axis of said photographing optical system, said driving means serving also as a driving means for obtaining image blur correction and diopter correction.

15. A photographing apparatus according to claim 1, further comprising a driving source for shifting a position of an optical axis of said photographing optical system, said driving source serving also as a driving source for obtaining image blur correction and diopter correction.

16. A photographing apparatus according to claim 1, further comprising control means for shifting a position of an optical axis of the photographing optical system, said control means serving also as control means of said diopter correcting means for obtaining blur correction as well as diopter correction.

17. A photographing apparatus according to claim 1, wherein said diopter correcting means tilts an entire photographing optical system.

18. A photographing apparatus according to claim 16, wherein an axis of rotation for tilting the optical axis of said photographing optical system is disposed in a position which corresponds approximately to a center of gravity of a rotator.

19. A photographing apparatus according to claim 16, wherein an axis of rotation for tilting the optical axis of said photographing optical system is disposed in a position where nearly a minimum moment of inertia of the rotator is obtained.

20. A photographing apparatus according to claim 16, wherein an axis of rotation for tilting the optical axis of said photographing optical system is disposed in a position which corresponds approximately to a center of gravity of a rotator, and there is provided a balancer for compensating for a change in the center of gravity resulting from a shift in position of an optical device of said photographing optical system.

21. A photographing apparatus according to claim 16, further comprising means for correcting or reducing a focal error resulting from tilting of said photographing optical system.

22. A photographing apparatus according to claim 16, wherein said diopter correcting means tilts an entire photographing optical system and a film or image sensing device together as one unit.

23. A photographing apparatus according to claim 1, wherein a photographing optical system has a variable focal length and controls activation and deactivation of said diopter correcting means in accordance with at least one of a photographing distance and a focal length.

24. A photographing apparatus comprising:
a photographing optical system;
a finder optical system having an optical axis which is different from an optical axis of said photographing optical system;
distance measuring means for measuring a distance to an object to be photographed; and
diopter correcting means for shifting a position of the optical axis of said photographing optical system relative to the optical axis of the finder optical system in accordance with an output of said distance measuring means for parallax correction, and wherein said diopter correcting means corrects for image blur responsive to sensors for detecting movement of the photographing optical system at a time a film or an image sensing device is exposed by a shutter operation.

25. A photographing apparatus comprising:
a photographing optical system;
a finder optical system having an optical axis which is different from an optical axis of said photographing optical system;
distance measuring means for measuring a distance to an object to be photographed; and
diopter correcting means for shifting a position of said film or image sensing device relative to said finder optical system in accordance with an output of said distance measuring means to correct for parallax, and wherein said diopter correcting means provides image blur correction responsive to sensors detecting movement of the photographing optical system at a time a film or image sensing device is exposed during a shutter operation.

26. A photographing apparatus for forming an image of an object to be photographed on a film or an image sensing device by a photographing optical system, comprising:
distance measuring means for measuring a distance to an object to be photographed;
diopter correcting means for shifting relative positions of an optical axis of the finder optical system and an optical axis of said photographing optical system in accordance with an output of said distance measuring means; and
position holding means for retaining said photographing optical system and a film or image sensing device in fixed positions after completion of operation of said diopter correcting means regardless of whether the photographing apparatus shakes or not.

27. A photographing apparatus according to claim 26, wherein said position holding means maintains positions of said photographing optical system and said film or image sensing device by a gyro effect obtained by operating gyro means.

28. A photographing apparatus according to claim 26, wherein said position holding means maintains a position of said photographing optical system by shielding said photographing optical system from vibration which takes place in the photographing apparatus by means providing a reaction force to the photographing apparatus to compensate for a vibration imparted to the photographing apparatus.

29. A photographing apparatus according to claim 26, wherein an axis of rotation for tilting an optical axis of said photographing optical system is disposed in a position which corresponds approximately to a center of gravity of a rotator.

30. A photographing apparatus according to claim 26, wherein an axis of rotation for tilting an optical axis of said photographing optical system is disposed in a position where nearly a minimum moment of inertia of a rotator is obtained.

31. A photographing apparatus according to claim 26, wherein an axis of rotation for tilting an optical axis of said photographing optical system is disposed in a position which corresponds approximately to a center of gravity of a rotator, and there is provided a balancer for compensating for a change in a center of gravity resulting from a shift in position of an optical device of said photographing optical system.

32. A photographing apparatus according to claim 26, further comprising means for correcting or reducing a focal error resulting from a tilting of said photographing optical system.

33. A photographing apparatus according to claim 26, comprising:
detecting means for detecting inoperativeness of said diopter correcting means; and stopping means for stopping operation of said diopter correcting means; wherein, if said detecting means detects an inoperativeness of said diopter correcting means, then said stopping means stops operation of said diopter correcting means and an exposure of the film or the image sensing device is performed without carrying out a diopter correction.

34. A photographing apparatus according to claim 26, wherein said photographing optical system has a variable focal length and means controlling activation and deactivation of said diopter correcting means in accordance with at least one of photographing distance and focal length.

35. A photographing apparatus comprising:
   a movable photographing optical system having a variable focal length;
   a fixed finder optical system having an optical axis which is different from an optical axis of said photographing optical system;
   distance measuring means for measuring a distance to an object to be photographed;
   diopter correcting means for changing positions of the optical axes of said photographing optical system and said finder optical system relative to one another in accordance with an output of said distance measuring means and focal length information of said photographing optical system; and
   control means for controlling activation and deactivation of said diopter correcting means in accordance with at least one of photographing distance and focal length.

36. A photographing apparatus according to claim 35, wherein said diopter correcting means tilts an entire photographing optical system.

37. A photographing apparatus according to claim 36, wherein an axis of rotation for tilting the optical axis of said photographing optical system is disposed in a position which corresponds approximately to a center of gravity of a rotator.

38. A photographing apparatus according to claim 36, wherein an axis of rotation for tilting the optical axis of said photographing optical system is disposed in a position where nearly a minimum moment of inertia of a rotator is obtained.

39. A photographing apparatus according to claim 36, wherein an axis of rotation for tilting the optical axis of said photographing optical system is disposed in a position which corresponds approximately to a center of gravity of a rotator, and there is provided a balancer for compensating for a change in a center of gravity resulting from a shift in position of an optical device of said photographing optical system.

40. A photographing apparatus according to claim 36, further comprising means for correcting or reducing a focal error resulting from tilting of said photographing optical system.

41. A photographing apparatus according to claim 36, wherein said diopter correcting means tilts an entire photographing optical system and the film or the image sensing device together as one unit.

42. A photographing apparatus according to claim 35, further comprising:
   detecting means for detecting inoperativeness of said diopter correcting means; and
   stopping means for stopping operation of said diopter correcting means; wherein,
   if said detecting means detects inoperativeness of said diopter correcting means, then said stopping means stops operation of said diopter correcting means, and an exposure of the film or the image sensing device is performed without carrying out the diopter correction.

43. A photographing apparatus according to claim 35, wherein said diopter correcting means moves said entire photographing optical system so that an original position and a changed position of the photographing optical axis remain substantially parallel.

44. A photographing apparatus according to claim 35, wherein said diopter correcting means tilts the photographing optical axis by shifting a position of an optical device which is a part of said photographing optical system.

45. A photographing apparatus according to claim 44, wherein said diopter correcting means tilts the photographing optical axis by changing an apex angle of a prism with variable apex angle provided in said photographing optical system.

46. A photographing apparatus according to claim 44, wherein said diopter correcting means tilts the photographing optical axis by decentering an optical device provided in said photographing optical system.

47. A photographing apparatus according to claim 44, wherein said diopter correcting means tilts the photographing optical axis by swinging a mirror provided in said photographing optical system.

48. A photographing apparatus according to claim 35, wherein said diopter correcting means moves the photographing optical axis so that an original position and a changed position of the photographing optical axis remain substantially parallel by shifting a position of an optical device which is a part of said photographing optical system.

49. A photographing apparatus according to claim 48, wherein said diopter correcting means moves the photographing optical axis so that an original position and a changed position of the photographing optical axis remain substantially parallel by changing an apex angle of a prism with variable apex angle provided in said photographing optical system.

50. A photographing apparatus according to claim 48, wherein said diopter correcting means moves the photographing optical axis so that an original position and a changed position of the photographing optical axis remain substantially parallel by decentering an optical device provided in said photographing optical system.

51. A photographing apparatus according to claim 48, wherein said diopter correcting means moves the photographing optical axis so that an original position and a changed position of the photographing optical axis remain substantially parallel by swinging a mirror provided in said photographing optical system.

52. A photographing apparatus according to claim 48, wherein said diopter correcting means moves the photographing optical axis so that an original position and a changed position of the photographing optical axis remain substantially parallel by moving a mirror provided in said photographing optical system.

53. A photographing apparatus according to claim 48, wherein said diopter correcting means moves the photographing optical axis so that an original position and a changed position of the photographing optical axis remain substantially in parallel by moving a parallel plane board provided in said photographing optical system.

54. A photographing apparatus comprising:
   a photographing optical system tiltably mounted in said photographing apparatus about mutually perpendicular tilt axes;
   a finder optical system having an optical axis which is different from an optical axis of said photographing optical system; and
   image blur correcting means for correcting an image blur at a time of exposure of a film or an image sensing device by shifting a position of the optical axis of said photographing optical system with respect to the optical axis of said finder optical system by tilting the photographing optical system and the film or image sensing device together as one unit about at least one of said tilt axes, responsive to a movement of the photographing apparatus during said time of exposure to counteract the movement of the photographing apparatus.

55. A photographing apparatus according to claim 54, wherein an axis of rotation for tilting the optical axis of said photographing optical system is disposed in a position which corresponds approximately to a center of gravity of a rotator.

56. A photographing apparatus according to claim 54, wherein an axis of rotation for tilting the optical axis of said photographing optical system is disposed in a position where nearly a minimum moment of inertia of a rotator is obtained.

57. A photographing apparatus according to claim 54, wherein an axis of rotation for tilting the optical axis of said photographing optical system is disposed in a position which corresponds approximately to a center of gravity of a rotator, and there is provided a balancer for compensating for a change in the center of gravity resulting from a shift in a position of an optical device of said photographing optical system.

58. A photographing apparatus according to claim 54, further comprising means for correcting or reducing a focal error resulting from tilting of said photographing optical system.

59. A photographing apparatus according to claim 54, further comprising:

detecting means for detecting inoperativeness of said image blur correcting means; and stopping means for stopping operation of said image blur correcting means; wherein, if said detecting means detects inoperativeness of said image blur correcting means, said stopping means stops operation of said image blur correcting means and an exposure of the film or the image sensing device is performed without carrying out image blur correction.

60. A photographing apparatus according to claim 54, wherein said image blur correcting means corrects image blur by moving an entire photographing optical system so that an original position and a changed position of the photographing optical axis remain substantially in parallel.

61. A photographing apparatus according to claim 60, further comprising:

detecting means for detecting inoperativeness of said image blur correcting means; and stopping means for stopping operation of said image blur correcting means; wherein, if said detecting means detects inoperativeness of said image blur correcting means, said stopping means stops operation of said image blur correcting means and an exposure of the film or the image sensing device is performed without carrying out image blur correction.

62. A photographing apparatus according to claim 54, wherein said image blur correcting means corrects image blur by tilting a photographing optical axis by shifting a position of an optical device which is a part of said photographing optical system.

63. A photographing apparatus according to claim 62, further comprising means for correcting or reducing a focal error resulting from tilting of said photographing optical system.

64. A photographing apparatus according to claim 54, wherein said image blur correcting means corrects image blur by moving a photographing optical axis so that an original position and a changed position of the photographing optical axis remain substantially parallel by shifting a position of an optical device which is a part of said photographing optical system.

65. A photographing apparatus for forming an image of an object to be photographed on a film or an image sensing device by a photographing optical system, comprising:

a fixed finder optical system having an optical axis which is different from an optical axis of said photographing optical system;

distance measuring means for measuring a distance to an object to be photographed;

diopter correcting means for shifting a position of the optical axis of said photographing optical system with respect to said finder optical system in accordance with an output of said distance measuring means;

position holding means for maintaining said photographing optical system and the film or image sensing device in fixed positions regardless of whether the photographing apparatus shakes or not; and control means for actuating said position holding means and enabling said photographing optical system and the film or image sensing device to move relative to an outer jacket of said photographing apparatus at least during an exposure operation.

66. A photographing apparatus for forming an image of an object to be photographed on a film or an image sensing device by a photographing optical system, comprising:

a finder optical system having an optical axis which is different from that of said photographing optical system;

distance measuring means for measuring a distance to an object to be photographed;

diopter correcting means for shifting a position of the optical axis of said photographing optical system with respect to said finder optical system in accordance with an output of said distance measuring means;

position holding means for maintaining said photographing optical system and the film or image sensing device in fixed positions regardless whether the photographing apparatus shakes or not; and lock means having a position for actuating said position holding means and enabling said photographing optical system and the film or image sensing device to move relative to an outer jacket of said photographing apparatus at least during exposure and a position for fixing said photographing optical system and the film or image sensing device together as one unit to the outer jacket of said photographing apparatus.

\* \* \* \* \*